(12) United States Patent
Chen

(10) Patent No.: US 9,806,877 B2
(45) Date of Patent: Oct. 31, 2017

(54) CALIBRATION METHOD AND CALIBRATION CIRCUIT

(71) Applicant: ALI CORPORATION, Hsinchu (TW)

(72) Inventor: Yue-Yong Chen, Zhuhai Guangdong (CN)

(73) Assignee: ALI CORPORATION, Hsinchu (TW)

( * ) Notice: Subject to any disclaimer, the term of this patent is extended or adjusted under 35 U.S.C. 154(b) by 0 days.

(21) Appl. No.: 15/291,938

(22) Filed: Oct. 12, 2016

(65) Prior Publication Data

US 2017/0163405 A1  Jun. 8, 2017

(30) Foreign Application Priority Data

Dec. 8, 2015 (CN) .......................... 2015 1 0898442

(51) Int. Cl.
*H04L 7/00* (2006.01)
(52) U.S. Cl.
CPC ................. *H04L 7/0033* (2013.01)
(58) Field of Classification Search
CPC ..... H04L 27/20; H04L 7/0033; H04L 7/0041; H04L 27/00; H04L 27/2626; H04L 27/364; H04L 25/49; H04L 27/12; H04B 17/11; H04B 1/406; H04B 1/0017; H03D 3/009

See application file for complete search history.

(56) References Cited

U.S. PATENT DOCUMENTS

| 7,627,055 | B2 | 12/2009 | Coersmeier | |
| 7,760,817 | B2* | 7/2010 | Lin | H03D 3/009 |
| | | | | 375/295 |
| 7,903,771 | B2* | 3/2011 | Cho | H04B 1/30 |
| | | | | 375/346 |
| 9,008,161 | B1* | 4/2015 | Chang | H04L 25/03261 |
| | | | | 375/219 |
| 2002/0150171 | A1* | 10/2002 | Myers | H03F 1/3247 |
| | | | | 375/296 |
| 2010/0197250 | A1* | 8/2010 | Jung | H04B 1/0475 |
| | | | | 455/115.1 |
| 2010/0198540 | A1* | 8/2010 | Yanagisawa | H04L 27/364 |
| | | | | 702/71 |
| 2010/0239056 | A1* | 9/2010 | Matsuno | H04L 27/364 |
| | | | | 375/346 |

(Continued)

FOREIGN PATENT DOCUMENTS

TW  201524166 A  6/2015

*Primary Examiner* — Khanh C Tran
(74) *Attorney, Agent, or Firm* — Li&Cai Intellectual Property (USA) Office

(57) ABSTRACT

Disclosed are a calibration method and a calibration circuit. The calibration method and the calibration circuit effectively calibrate the mismatches between the first signal path and the second signal path of a transmitter by calibrating a plurality of tap coefficients of the FIR filter configured in the second signal path and optimizing the tap coefficients. The calibration and optimization for the tap coefficients of the FIR filter is according to differences between the electrical characteristics the DAC convertor and the LPF in the first signal path and differences between the DAC convertor and the LPF in the second signal path. These differences are obtained when the data transmission has not yet started by the transmitter (that is, when the transmitter is working in a training mode).

10 Claims, 7 Drawing Sheets

(56) References Cited

U.S. PATENT DOCUMENTS

2014/0072077 A1\* 3/2014 Cheng .................... H04L 27/20
 375/303
2015/0030103 A1\* 1/2015 Hormis ................ H04L 27/364
 375/296
2015/0155955 A1 6/2015 Chang et al.

\* cited by examiner

CALIBRATION METHOD AND CALIBRATION CIRCUIT

BACKGROUND OF THE INVENTION

1. Field of the Invention

The instant disclosure relates to a calibration method and a calibration circuit; in particular, to a method and a circuit that calibrate mismatches between a first signal path and a second signal path of a transmitter.

2. Description of Related Art

How to compensate mismatches between an in-phase signal path and a quadrature signal path of a transmitter is rather important with regard to transmitters used in the current wireless communication field.

There are mainly two reasons why there will be mismatches between the in-phase signal path and the quadrature signal path of a transmitter. One is that, it is hard to have a perfect 90 degrees phase difference between the signal waves that are generated by a local oscillator and input to an in-phase signal path and a quadrature signal path respectively. In other aspect, the amplitudes of the signal waves that are generated by a local oscillator and input to an in-phase signal path and a quadrature signal path respectively are not equal. A phase difference and/or an amplitude difference mentioned in the above reasons lead to mismatches between the in-phase signal path and the quadrature signal path. Even though the phase difference and/or the amplitude difference are minor, they still bring an obvious interference affecting the whole communication system, which causes an abnormal quadrature demodulation and results in a loss of the transmitted data and an increase of the bit error rate (BER).

Besides, even though the phase difference and amplitude difference can be calibrated, when the frequency of the input baseband signal varies or the baseband signal is inputted to a communication system having a wider frequency band, there may still be mismatches between the in-phase signal path and the quadrature signal path of the transmitter due to the frequency dependency, because mismatches between local oscillators and between mixers may not be related to the frequency of the baseband signal. The above mismatches due to the frequency dependency are caused by differences between electrical characteristics of the corresponding circuit elements in the in-phase signal path and in the quadrature signal path, such as differences between electrical characteristics of the filter in the in-phase signal path and the filter in the quadrature signal path. In other words, the mismatches between the in-phase signal path and the quadrature signal path of the transmitter may be generated because of certain defects in the electric element manufacturing process, which makes the electrical characteristics of the corresponding electric elements in the in-phase signal path and in the quadrature signal path not match perfectly, further making the signals passing through the in-phase signal path and the quadrature signal path different and generating an unexpected image interference. Accordingly, how to compensate mismatches between the in-phase signal path and the quadrature signal path of a transmitter resulted from the frequency dependency is still a problem to be solved.

SUMMARY OF THE INVENTION

The instant disclosure provides a calibration method, used to calibrate mismatches between a first signal path and a second signal path of a transmitter. A delay chain is configured in the first signal path of the transmitter to delay a signal transmitted through the first signal path. A finite impulse response (herein after FIR) filter is configured in the second signal path to compensate the mismatches between the first signal path and the second signal path of the transmitter. The calibration method comprises: respectively inputting a multiple-frequency signal to a digital-to-analog converter (DAC) configured in both of the first signal path and the second signal path, and respectively inputting an output of the digital-to-analog converter in the first signal path and an output of the digital-to-analog converter in the second signal path to a low-pass filter (LPF) configured in both of the first signal path and the second signal path, to generate a first test signal corresponding to the first signal path and a second test signal corresponding to the second signal path; respectively sampling the first test signal and the second test signal by at least one analog-to-digital converter (ADC), and respectively feeding sampling results generated by the analog-to-digital converter back to the delay chain and the FIR filter, to generate a delay signal and a compensated output signal; and executing a subtraction operation for the delay signal and the compensated output signal to obtain a first calibration coefficient related to the FIR filter in the second signal path, and calibrating a plurality of tap coefficients of the FIR filter by the first calibration coefficient, such that the calibrated FIR filter in the second signal path compensates the mismatches between the first signal path and the second signal path of the transmitter.

The instant disclosure further provides a calibration circuit, used to calibrate mismatches between a first signal path and a second signal path of a transmitter. A delay chain is configured in the first signal path of the transmitter to delay a signal transmitted through the first signal path. A FIR filter is configured in the second signal path to compensate the mismatches between the first signal path and the second signal path of the transmitter. The calibration circuit comprises a test signal generating unit, a sampling unit and a first calibration unit. The test signal generating unit respectively inputs a multiple-frequency signal to a digital-to-analog converter configured in both of the first signal path and the second signal path, and respectively inputs an output of the digital-to-analog converter in the first signal path and an output of the digital-to-analog converter in the second signal path to a low-pass filter configured in both of the first signal path and the second signal path, to generate a first test signal corresponding to the first signal path and a second test signal corresponding to the second signal path. The sampling unit respectively samples the first test signal and the second test signal by at least one analog-to-digital converter, and respectively feeds sampling results generated by the analog-to-digital converter back to the delay chain and the FIR filter, to generate a delay signal and a compensated output signal. The first calibration unit executes a subtraction operation for the delay signal and the compensated output signal, to obtain a first calibration coefficient related to the FIR filter in the second signal path, and calibrates a plurality of tap coefficients of the FIR filter by the first calibration coefficient, such that the calibrated FIR filter in the second signal path compensates the mismatches between the first signal path and the second signal path.

To sum up, the calibration method and the calibration circuit provided by the instant disclosure calibrate a plurality of tap coefficients of the FIR filter in the second signal path and optimizes the tap coefficients, according to the different electrical characteristics, obtained before the data transmission has started by the transmitter (that is, when the transmitter is working in the training mode), between the DAC convertor and the LPF configured in the first signal path and the DAC convertor and the LPF configured in the second signal path. Compared with the traditional calibration method and the traditional calibration circuit, the calibration method and the calibration circuit provided by the instant disclosure can compensate mismatches between the first signal path and the second signal path with a high efficiency and a high accuracy.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
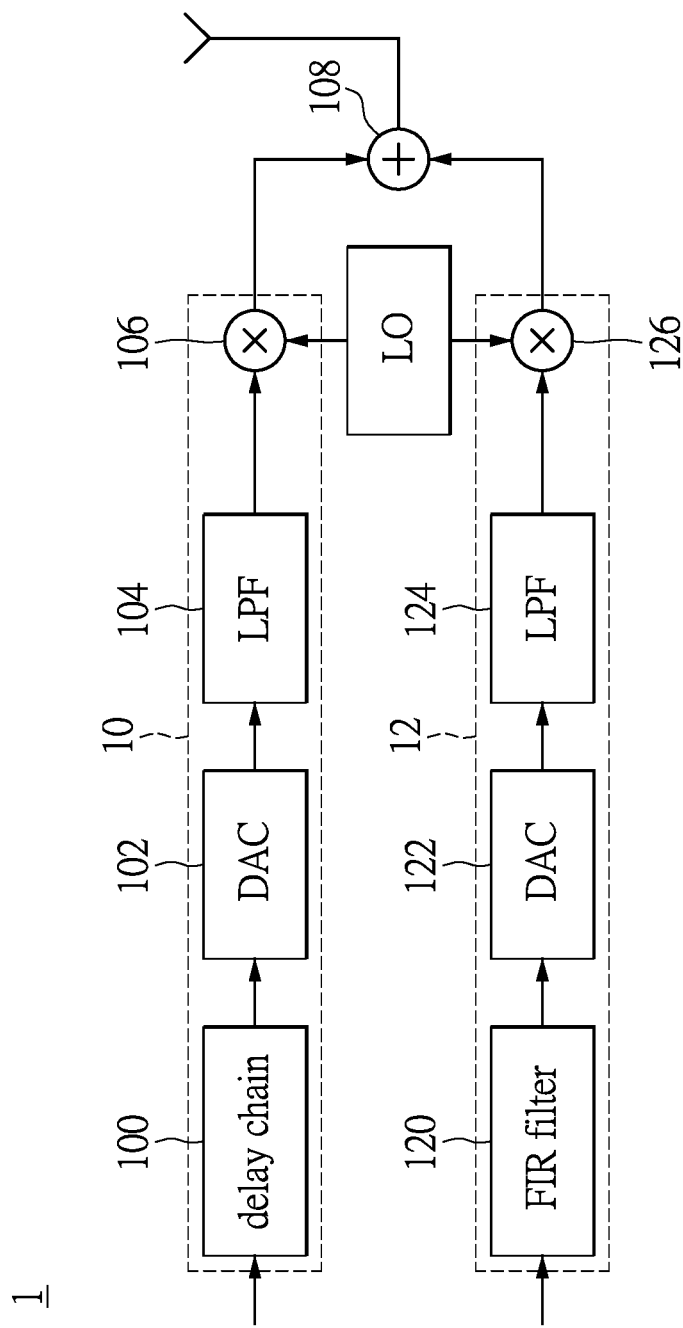
FIG. 1 shows a block diagram of a transmitter of one embodiment of the instant disclosure.

The calibration method provided in this embodiment can be used in a transmitter in any communication system. For example, the communication system may be an orthogonal frequency-division multiplexing (OFDM) system, but it is not limited herein. Refer to FIG. 1. FIG. 1 shows a block diagram of a transmitter of one embodiment of the instant disclosure. The transmitter 1 has a first signal path 10 and a second signal path 12, wherein a digital-to-analog converter 102, a low-pass filter 104 and a mixer 106 are configured in the first signal path 10, and a digital-to-analog converter 122, a low-pass filter 124 and a mixer 126 are configured in the second signal path 20. Moreover, a delay chain 100 is configured in the first signal path 10 to delay an input signal in the first signal path 10, and a finite impulse response (herein after FIR) filter 120 is configured in the second signal path 12 to compensate mismatches between the first signal path 10 and the second signal path 12. It is worth mentioning that, the working principles of the delay chain 100 and the FIR filter 120 can be easily understood by those skilled in the art, and thus the information is not repeated here.

Even though the FIR filter 120 can compensate differences between the electrical characteristics of the digital-to-analog converters 102 and 122, and between the electrical characteristics of the low-pass filters 104 and 124 (that is, the FIR filter 120 can compensate mismatches between the first signal path 10 and the second signal path 12), but when the transmitter 1 is working in a normal data transmitting mode, the mismatches between the first signal path 10 and the second signal path 12 may vary with certain factors, such as the temperature. In this case, the mismatches need to be again compensated, which needs another calibration process and takes a long time which results in the fact that the mismatches between the first signal path 10 and the second signal path 12 cannot be compensated accurately and efficiently.

Figure 2:
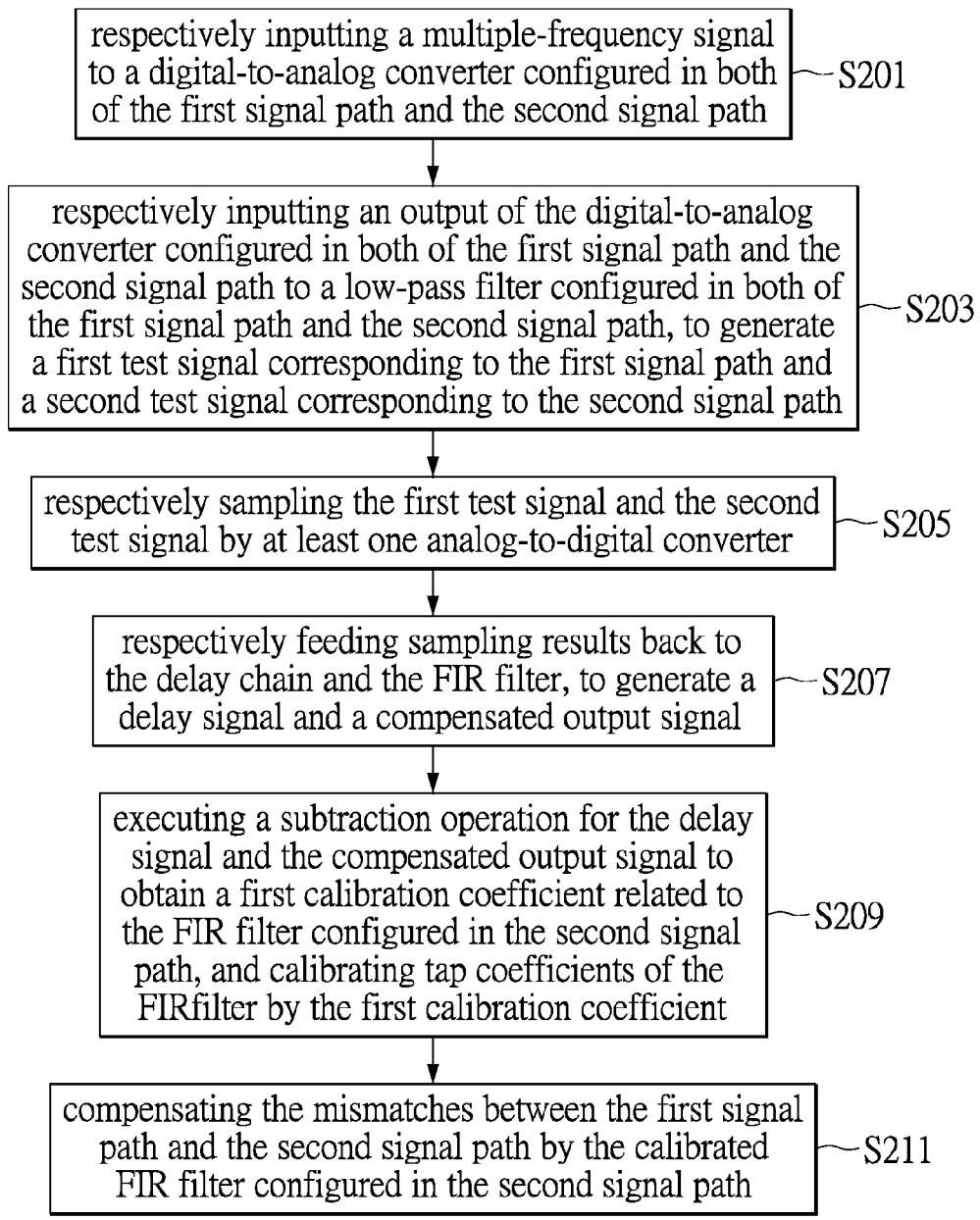
FIG. 2 shows a flow chart of a calibration method of one embodiment of the instant disclosure.

Refer to FIG. 2. FIG. 2 shows a flow chart of a calibration method of one embodiment of the instant disclosure. The calibration method provided by the embodiment shown in FIG. 2 can be implemented in the transmitter 1 shown in FIG. 1, but it is not limited herein.

In step S201, a multiple-frequency signal is respectively inputted to a digital-to-analog converter 102 in a first signal path 10 and a digital-to-analog converter 122 in a second signal path 12. In step S203, an output of the digital-to-analog converter 102 in the first signal path 10 is inputted to a low-pass filter 104 in the first signal path 10, and an output of the digital-to-analog converter 122 in the second signal path 12 is inputted to a low-pass filter 124 in the second signal path 12, to generate a first test signal corresponding to the first signal path 10 and a second test signal corresponding to the second signal path 12.

In addition, in step S205, at least one analog-to-digital converter (not shown in FIG. 1) samples from the first test signal and the second test signal. After that, in step S207, sampling results generated by the analog-to-digital converter are fed back to the delay chain 100 and the FIR filter 120 to generate a delay signal and a compensated output signal.

In step S209, a subtract operation is executed for the delay signal and the compensated output signal, to obtain a first calibration coefficient related to the FIR filter 120 in the second signal path 12. After that, tap coefficients of the FIR filter 120 are calibrated by the first calibration coefficient. Finally, in step S211, the FIR filter 120 with the calibrated tap coefficients in the second signal path 12 compensates mismatches between the first signal path 10 and the second signal path 12 of the transmitter 1.

Thus, according to the above description, it is known that one of achievements of the calibration method provided by this embodiment is that, before the transmitter 1 starts to transmit data (that is, when the transmitter 1 is working in a training mode), differences between the electrical characteristics of the digital-to-analog converters 102 and 122, and between the electrical characteristics of the low-pass filters 104 and 124 can be obtained via a multiple-frequency signal generated by the transmitter 1. Besides, after the multiple-frequency signals are simultaneously transmitted through the digital-to-analog converter 102 and the low-pass filter 104 in the first signal path 10, and transmitted through the digital-to-analog converter 122 and the low-pass filter 124 in the second signal path 12, the analog-to-digital converter samples the multiple-frequency signal and sampling results generated by the analog-to-digital converter are respectively fed back to the delay chain 100 and the FIR filter 120. The multiple-frequency signals do not be transmitted from a radio frequency module (such as mixers 106 and 126, a summator 108 and an oscillator LO shown in FIG. 1) after passing through the digital-to-analog converter 102 and the low-pass filter 104 in the first signal path 10, and passing through the digital-to-analog converter 122 and the low-pass filter 124 in the second signal path 12.

After that, a first calibration coefficient related to the FIR filter 120 is obtained according to an output of the delay chain 100 and an output of the FIR filter 120. The first calibration coefficient is used to calibrate a plurality of tap coefficients of the FIR filter 120, and thus the optimum values of these tap coefficients can be determined. As a result, when the transmitter 1 starts to transmit data (that is, the transmitter 1 is working in a normal data transmitting mode), the transmitter 1 can compensate mismatches between the first signal path 10 and the second signal path 12 by the FIR filter 120 with the calibrated tap coefficients. Thereby, the mismatches between the first signal path 10 and the second signal path 12 can be effectively compensated. Logically, steps S201~S209 are supposed to be executed before the transmitter 1 starts to transmit data (that is, the transmitter 1 is working in a training mode).

Figure 3:
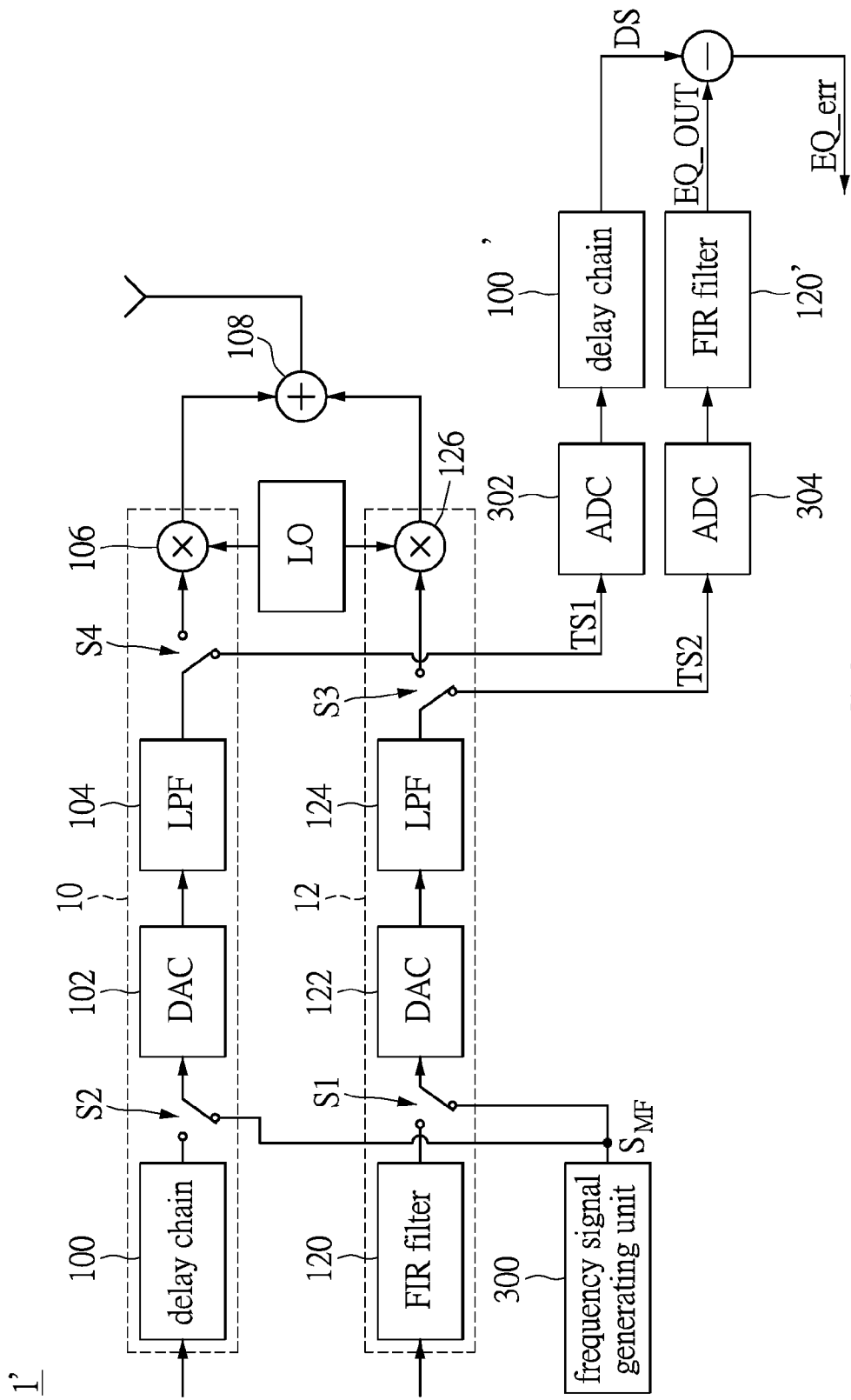
FIG. 3 shows a block diagram of a transmitter of another embodiment of the instant disclosure.

To further illustrate in detail how steps S201~S209 are executed in the transmitter 1 shown in FIG. 1, there is another embodiment provided in the following description. Refer to FIG. 3. FIG. 3 shows a block diagram of a transmitter of another embodiment of the instant disclosure. In FIG. 1 and FIG. 3, similar numbers or symbols refer to the same elements.

Compared with the transmitter 1 shown in FIG. 1, the transmitter 1' shown in FIG. 3 further comprises four switch elements S1~S4 to switch the transmitter 1' to the training mode or to the normal data transmitting mode. When the transmitter 1' is working in the training mode, the digital-to-analog converters 102 and 122 are both connected to a frequency signal generating unit 300 by the switching elements S1 and S2. The frequency signal generating unit 300 is configured as a signal source to output a multiple-frequency signal SMF respectively to the digital-to-analog converter 102 in the first signal path 10 and to the digital-to-analog converter 122 in the second signal path 12. The low-pass filters 104 and 124 are respectively connected to the analog-to-digital converters 302 and 304 by the switching elements S3 and S4. In the prior art, the signal source under the training mode of a transmitter is usually a single frequency signal. However, the calibration method provided by this embodiment uses a multiple-frequency signal SMF as the signal source in the training mode, and thus the differences between the electrical characteristics of the digital-to-analog converters 102 and 122, and between the electrical characteristics of the low-pass filters 104 and 124 can be effectively obtained, which helps to determine the optimum values for the tap coefficients of the FIR filter 120.

On the other hand, after the multiple-frequency signal SMF respectively passes through the digital-to-analog converter 102 and the low-pass filter 104 and through the digital-to-analog converter 122 and the low-pass filter 124, a first test signal TS1 corresponding to the first signal path 10 and a second test signal TS2 corresponding to the second signal path 12 are generated. The first test signal TS1 and the second test signal TS2 are then sampled by the analog-to-digital converters 302 and 304. The working principle of the analog-to-digital converters 302 and 304 is easily understood by those skilled in the art and thus the detailed description for the sampling process done by the analog-to-digital converters 302 and 304 is omitted herein.

After that, sampling results generated by the analog-to-digital converters 302 and 304 are fed back to the delay chain 100 and the FIR filter 120. For ease of understanding, the designed circuit configuration for a feedback to a delay chain 100' (similar to the delay chain 100) and a FIR filter 120' (similar to the FIR filter 120) are similar to the designed circuit configuration for an input to the delay chain 100' and the FIR filter 120'. In other words, the delay chain 100' shown in the left side of FIG. 3 plays a role as the delay chain 100 shown in the right side of FIG. 3, and the FIR filter 120' shown in the left side of FIG. 3 plays a role as the FIR filter 120 shown in the right side of FIG. 3. Thereby, it can be known that, respectively feeding the sampling results generated by the analog-to-digital converters 302 and 304 back to the delay chain 100' and the FIR filter 120' to generate a delay signal DS and a compensated output signal EQ_OUT is similar to respectively feeding the sampling results generated by the analog-to-digital converters 302 and 304 back to the delay chain 100 and the FIR filter 120 to generate a delay signal DS and a compensated output signal EQ_OUT. In step S207, the compensated output signal EQ_OUT can be represented by an equation (1):

$$EQ\_OUT = \text{sum}(\text{Input}\_n * \text{Coef}\_n) \qquad \text{Equation (1)}$$

"Input_n" is the $n^{th}$ value that is inputted to the FIR filter 120' (that is, the $n^{th}$ value of the sampling result generated by the analog-to-digital converter 304), and the "Coef_n" is the value of the $n^{th}$ tap coefficient of the FIR filter 120' (that is, the value of the $n^{th}$ tap coefficient of the FIR filter 120). It is worth mentioning that, in step S207, the tap coefficients have not yet been calibrated, and thus the "Coef_n" in the equation (1) is the initial value of the $n^{th}$ tap coefficient. Moreover, in step S209, the obtained first calibration coefficient EQ_err can be represented by an equation (2):

$$EQ\_err = DS - EQ\_OUT \qquad \text{Equation (2)}$$

Further, in step S209, the calibration based on the first calibration coefficient EQ_err for a plurality of tap coefficients Coef_n of the FIR filter 120' (that is FIR filter 120) can be represented by an equation (3):

$$EQ\_err = DS - EQ\_OUT \qquad \text{Equation (3)}$$

Wherein, "Coef_n'" is the value of the $n^{th}$ calibrated tap coefficient, and "step" is a programmable coefficient. However, the equation (3) is taken as an example to show the calibration for the tap coefficients, but not as a restriction. Thus, the calibration for the tap coefficients can be also represented as an equation (4):

$$\text{Coef}\_n' = \text{Coef}\_n + (\text{step} * \text{sin\_of}\_EQ\_err * \text{Input}\_n) \qquad \text{Equation (4)}$$

"Sin_of_EQ_err" is a symbol bit of the first calibration coefficient EQ_err. For example, when the first calibration coefficient EQ_err is larger than zero, and the symbol bit sin_of_EQ_err is "1". If the first calibration coefficient EQ_err is smaller than zero, and the symbol bit sin_of_EQ_err is "−1". In addition, when the first calibration coefficient EQ_err is equal to zero, the symbol bit sin_of_EQ_err is "0". Thus, the calibration method or circuit for the tap coefficients Coef_n can be set by those skilled in the art as needed. No limitations are attempted to be made herein.

Finally, after the transmitter 1' has obtained all of the calibrated tap coefficients Coef_n', the transmitter 1' starts to work in the normal data transmitting mode. In other words, the digital-to-analog converters 102 and 122 are again respectively connected to the delay chain 100 and the FIR filter 120 by the switching elements S1 and S2, and the low-pass filters 104 and 124 are again respectively connected to the mixers 106 and 126. Thus, even though the mismatches between the first signal path 10 and the second signal path 12 may vary with certain factors such as the temperature during the time when the transmitter 1' is working in the normal data transmitting mode, the transmitter 1' in this embodiment can anytime be switched to the training mode. Thereby, in the calibration method provided by this embodiment, based on the tap coefficients that are most recently calibrated, it only takes a short time for the transmitter 1' to adjust the tap coefficients again by the same calibration method. Compared with the prior art, the mismatches between the first signal path 10 and the second signal path 12 can be compensated more accurately and with a high efficiency. Moreover, one of the first signal path 10 and the second signal path 12 is supposed to be an in-phase signal path, and the other one is supposed to be a quadrature signal path correspondingly, but it is not limited herein.

Figure 4A:
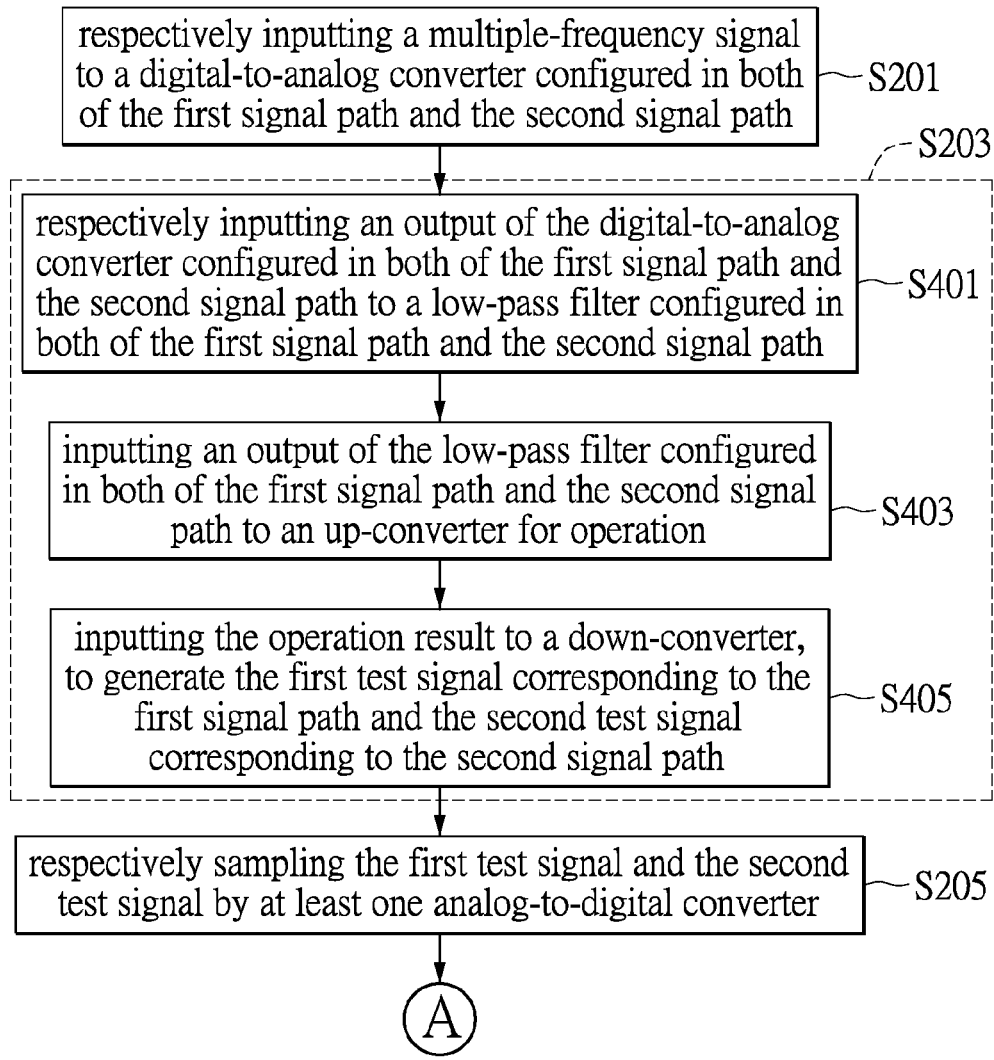
FIG. 4A and FIG. 4B show flow charts of a calibration method of another embodiment of the instant disclosure.
Figure 4B:
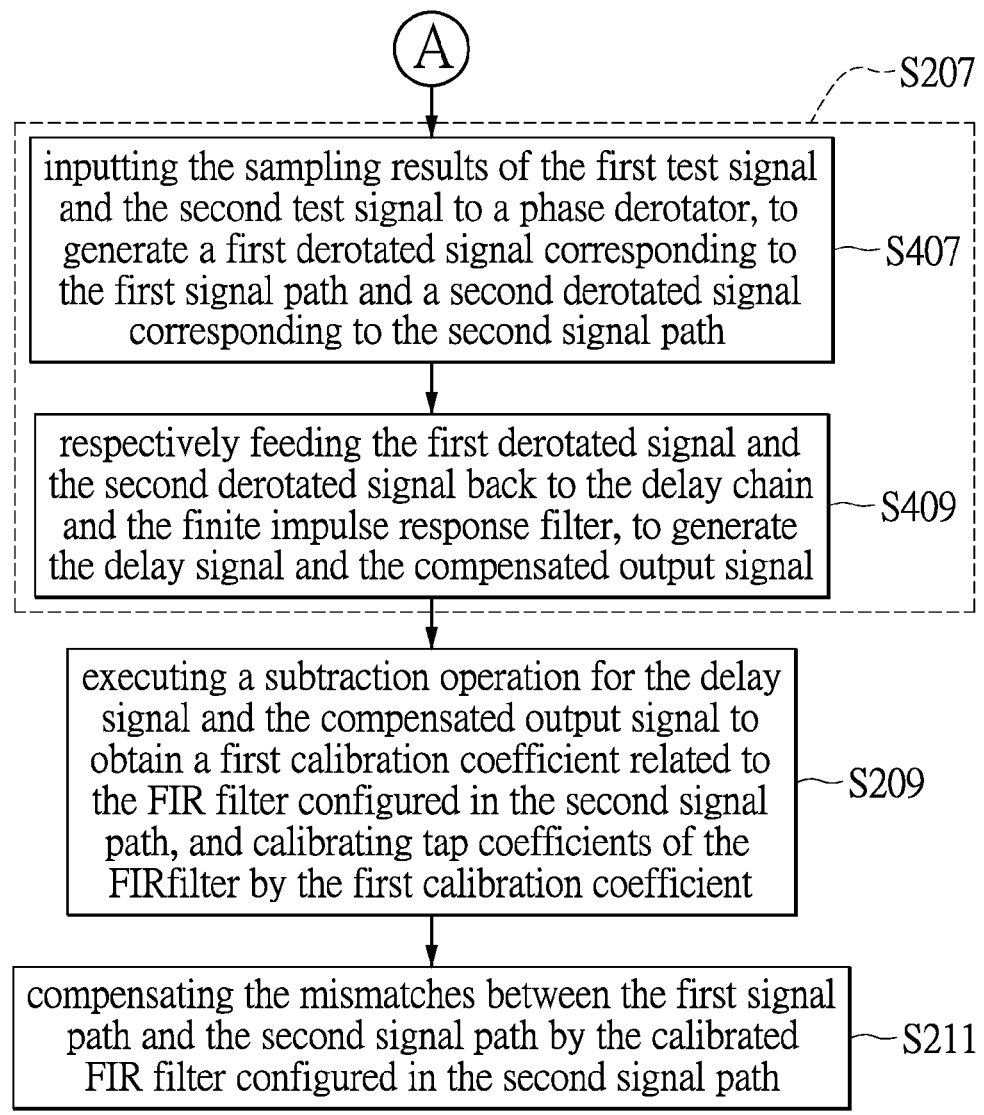
Figure 5:
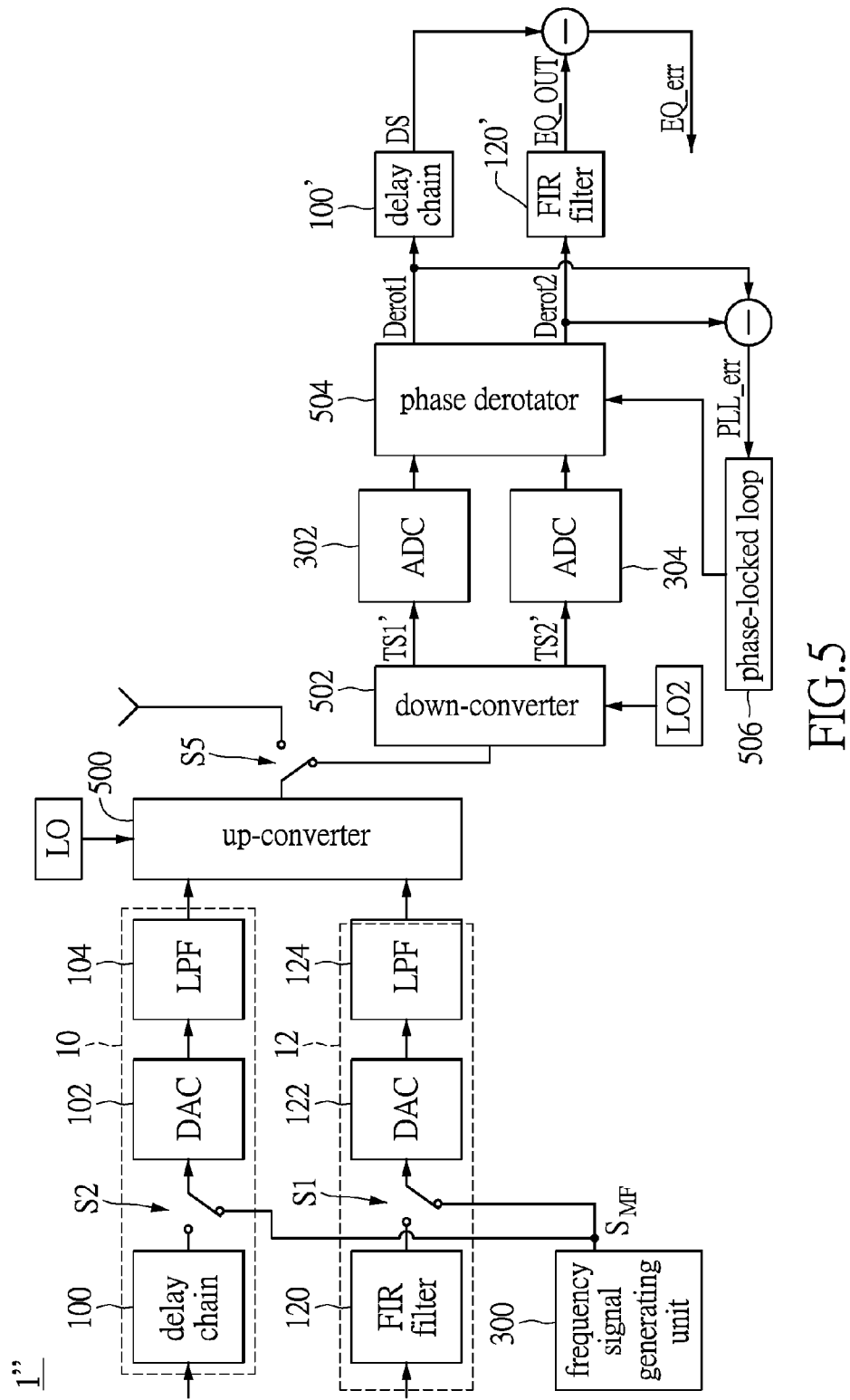
FIG. 5 shows a block diagram of a transmitter of still another embodiment of the instant disclosure.

As described, there may also be mismatches among the local oscillator LO, the mixer 106 and the mixer 126. Thus, another embodiment described below is for illustrating how to obtain the first calibration coefficient EQ_err of the FIR filter 120 in the second signal path 12 in the instant disclosure. FIG. 4A and FIG. 4B show flow charts of a calibration method of another embodiment of the instant disclosure, and FIG. 5 shows a block diagram of a transmitter of still another embodiment of the instant disclosure. The calibration method shown in FIG. 4A and FIG. 4B can be executed by the transmitter shown in FIG. 5, but it is not limited herein. In addition, for easy instruction, in FIG. 2 and FIGS. 4A~4B similar reference numbers or symbols refer to steps alike, and in FIG. 3 and FIG. 5 similar reference numbers or symbols refer to elements alike Refer to FIG. 2, FIGS. 4A~4B and FIG. 5. Step S203 further comprises steps S401~S405. In step S401, an output of the digital-to-analog converter 102 in the first signal path 10 and an output of the digital-to-analog converter 122 in the second signal path 12 are respectively inputted to the low-pass filter 104 in the first signal path 10 and the low-pass filter 124 in the second signal path 12. After that, in step S403, an output of the low-pass filter 104 in the first signal path 10 and an output of the low-pass filter 124 in the second signal path 12 are inputted to an up-converter 500 for operation. Finally, in step S405, an operation result generated by the up-converter 500 is inputted to a down-converter 502 to generate a first test signal TS1' corresponding to the first signal path 10 and a second test signal TS2' corresponding to the second signal path 12.

In addition, step S207 further comprises steps S407~S409. In step S407, sampling results of the first test signal and the second test signal generated by the analog-to-digital converters 302 and 304 are inputted to a phase derotator 504 to generate a first derotated signal Derot1 corresponding to the first signal path 10 and a second derotated signal Derot2 corresponding to the second signal path 12. After that, in step S409, the first derotated signal and the second derotated signal are respectively fed back to the delay chain 100 and the FIR filter 120 to generate a delay signal DS and a compensated output signal EQ_OUT.

Compared with the transmitter 1' shown in FIG. 3, the transmitter 1" shown in FIG. 5 further comprises three switching elements S1, S2 and S5 to switch the training mode and the normal data transmitting mode of the transmitter 1". In addition, the up-converter 500 shown in FIG. 5 can be considered as the integration of the mixers 106 and 126 and the summator 108 in both of FIG. 1 and FIG. 3.

When the transmitter 1" is working in the training mode, the up-converter 500 is connected to the down-converter 502 by the switching element S5, such that after multiple-frequency signals SMF pass through the digital-to-analog converter 102, the low-pass filter 104 and the up-converter 500, and multiple-frequency signals SMF pass through the digital-to-analog converter 122, the low-pass filter 124 and the up-converter 500, they will not be emitted through the antenna but be directly down-converted by the down-converter 502 (that is, an RF signal is down-converted to a baseband signal) to generate a first test signal TS1' corresponding to the first signal path 10 and a second test signal TS2' corresponding to the second signal path 12. At the same time, the first test signal TS1' and the second test signal TS2' are sampled by the analog-to-digital converters 302 and 304 respectively.

Sampling results generated by the analog-to-digital converters 302 and 304 are inputted to a phase derotator 504 to generate a first derotated signal Derot1 corresponding to the first signal path 10 and a second derotated signal Derot2 corresponding to the second signal path 12. After that, the first derotated signal Derot1 and the second derotated signal Derot2 are respectively inputted to a delay chain 100' and a FIR filter 120' (that is, the first derotated signal Derot1 and the second derotated signal Derot2 are respectively fed back to the delay chain 100 and the FIR filter 120) to generate a delay signal DS and a compensated output signal EQ_OUT.

Thus, it can be easily understood that, one of achievements of embodiments shown in FIG. 4 and FIG. 5 is to additionally compensate mismatches among elements of the up-converter 500 (that is, the mixers 106 and 126 and the summator 108 shown in FIG. 1 and FIG. 3) so as to obtain a more accurate first calibration coefficient EQ_err that helps to increase the efficiency of compensating mismatches between the first signal path 10 and the second signal path.

Again refer to FIG. 5. From the above description, it should be understood by those skilled in the art that, there may be a minor frequency offset between the local oscillator LO (that is, the oscillator of the up-converter 500) and an oscillator LO2 of the down-converter 502. Thus, the transmitter 1" further comprises a phase-locked loop (PLL) 506 to adjust outputs of the phase derotator 504, which are the first derotated signal Derot1 and the second derotated signal Derot2, such that the frequency offset between the local oscillator LO and the oscillator LO2 can be effectively fixed.

Specifically, in this embodiment, a subtraction operation is executed for the first derotated signal Derot1 and the second derotated signal Derot2 to obtain a second calibration coefficient PLL err related to the phase-locked loop 506 configured between the first signal path 10 and the second signal path 12. Also, the first derotated signal Derot1 and the second derotated signal Derot2 generated by the phase derotator 504 are adjusted by the second calibration coefficient PLL err.

Figure 6:
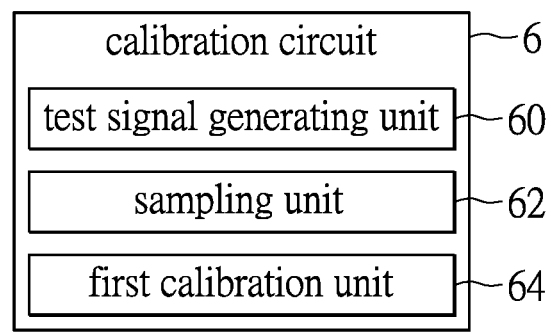
FIG. 6 shows a block diagram of a calibration circuit of one embodiment of the instant disclosure.

For further illustrating the calibration method provided by the instant disclosure, there is a calibration circuit of one embodiment of the instant disclosure provided herein. Refer to FIG. 6. FIG. 6 shows a block diagram of a calibration circuit of one embodiment of the instant disclosure. However, the calibration circuit 6 described as below is for illustrating how the calibration methods in the above embodiments can be executed but not for restricting the instant disclosure.

The calibration circuit 6 comprises a test signal generating unit 60, a sampling unit 62 and a first calibration unit 64, which can be implemented by hardware circuits, or the hardware circuit with a firmware or software, and it is not limited herein. In addition, the test signal generating unit 60, the sampling unit 62 and the first calibration unit 64 can be integrated with each other or each of them can be independent, and it is also not limited herein.

The test signal generating unit 60 inputs a multiple-frequency signal to a digital-to-analog converter in the first signal path and to a digital-to-analog converter in the second signal path respectively. An output of the digital-to-analog converter in the first signal path and an output of the digital-to-analog converter in the second signal path are inputted to a low-pass filter in the first signal path and to a low-pass filter in the second signal path, to generate a first test signal corresponding to the first signal path and a second test signal corresponding to the second signal path.

The sampling unit 62 respectively samples the first test signal and the second test signal by at least one analog-to-digital converter. Sampling results generated by the sampling unit 62 are fed back to a delay chain and a FIR filter respectively, to generate a delay signal and a compensated output signal.

The first calibration unit 64 executes a subtraction operation for the delay signal and the compensated output signal to obtain a first calibration coefficient related to the FIR filter in the second signal path. A plurality of tap coefficients of the FIR filter is calibrated by the first calibration coefficient, such that the FIR filter having the calibrated tap coefficients can compensate mismatches between the first signal path and the second signal path.

The calibration circuit 6 of FIG. 6 can work with the transmitter 1' shown in FIG. 3, but details herein are not repeated again.

Figure 7:
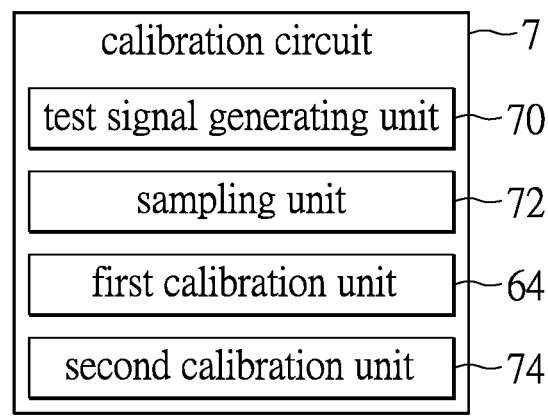
FIG. 7 shows a block diagram of a calibration circuit of another embodiment of the instant disclosure.

As mentioned, when mismatches between elements in an up-converter (that is, a combination of the mixer and the summator) are also compensated, a more accurate first calibration coefficient can be obtained, which can be illustrated by another embodiment as below. Refer to FIG. 7. FIG. 7 shows a block diagram of a calibration circuit of another embodiment of the instant disclosure. However, the calibration circuit 7 shown in FIG. 7 is only one example circuit that can execute the calibration method in the above embodiments. In addition, for easy instruction, in FIG. 6 and FIG. 7, similar reference numbers or symbols refer to the same elements.

Specifically, the calibration circuit 7 comprises a test signal generating unit 70, a sampling unit 72, a first calibration unit 64 and a second calibration unit 74. The test signal generating unit 70, the sampling unit 72, the first calibration unit 64 and the second calibration unit 74 can be implemented by hardware circuits or hardware circuits with a firmware or software, and it is not limited herein. In addition, the test signal generating unit 70, the sampling unit 72, the first calibration unit 64 and the second calibration unit 74 can be integrated with each other or each of them can be independent, and it is also not limited herein.

The test signal generating unit 70 inputs a multiple-frequency signal to a digital-to-analog converter configured both in the first signal path and the second signal path. An output of the digital-to-analog converter in the first signal path and an output of the digital-to-analog converter in the second signal path are inputted to a low-pass filter configured both in the first signal path and a low-pass filter respectively. An output of the low-pass filter in the first signal path and an output of the low-pass filter in the second signal path are inputted to an up-converter for operation, and an operation result is inputted to a down-converter to generate a first test signal corresponding to the first signal path and a second test signal corresponding to the second signal path.

The sampling unit 72 samples the first test signal and the second test signal by at least one analog-to-digital converter. Sampling results generated by the sampling unit 72 are inputted to a phase derotator to generate a first derotated signal corresponding to the first signal path and a second derotated signal corresponding to the second signal path. After that, the first derotated signal and the second derotated signal are fed back respectively to a delay chain and a FIR filter to generate a delay signal and a compensated output signal.

The second calibration unit 74 executes a subtraction operation for the first derotated signal and the second derotated signal to obtain a second calibration coefficient related to a phase-locked loop configured between the first signal path and the second signal path. After that, the second calibration unit 74 adjusts the first derotated signal and the second derotated signal generated from the phase derotator by the second calibration coefficient In conjunction with FIG. 5 and FIG. 7, the calibration circuit 7 shown in FIG. 7 can work with the transmitter 1" shown in FIG. 5, but details herein are not repeated again.

To sum up, the calibration method and the calibration circuit provided by the instant disclosure calibrate a plurality of tap coefficients of the FIR filter in the second signal path and optimizes the tap coefficients, according to the different electrical characteristics, obtained before the data transmission has started by the transmitter (that is, when the transmitter is working in the training mode), between the DAC convertor and the LPF configured in the first signal path and the DAC convertor and the LPF configured in the second signal path. Compared with the traditional calibration method and the traditional calibration circuit, the calibration method and the calibration circuit provided by the instant disclosure can compensate mismatches between the first signal path and the second signal path with a high efficiency and a high accuracy.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A calibration method, used to calibrating mismatches between a first signal path and a second signal path of a transmitter, wherein a delay chain is configured in the first signal path to delay a signal transmitted through the first signal path, and a finite impulse response filter is configured in the second signal path to compensate the mismatches between the first signal path and the second signal path, the calibration method comprising:

inputting a multiple-frequency signal to a digital-to-analog converter configured in both of the first signal path and the second signal path, and respectively inputting an output of the digital-to-analog converter in the first signal path and an output of the digital-to-analog converter in the second signal path to a low-pass filter configured in both of the first signal path and the second signal path, to generate a first test signal corresponding to the first signal path and a second test signal corresponding to the second signal path;

respectively sampling the first test signal and the second test signal by at least one analog-to-digital converter, and respectively feeding sampling results generated by the analog-to-digital converter back to the delay chain and the finite impulse response filter, to generate a delay signal and a compensated output signal; and executing a subtraction operation for the delay signal and the compensated output signal to obtain a first calibration coefficient related to the finite impulse response filter in the second signal path, and calibrating a plurality of tap coefficients of the finite impulse response filter by the first calibration coefficient, such that the calibrated finite impulse response filter in the second signal path compensates the mismatches between the first signal path and the second signal path of the transmitter.

2. The calibration method according to claim 1, wherein one of the first signal path and the second signal path is an in-phase signal path and the other one is a quadrature signal path.

3. The calibration method according to claim 1, wherein the step of generating the first test signal and the second test signal further comprises:
inputting an output of the low-pass filter in the first signal path and an output of the low-pass filter in the second signal path to an up-converter for operation, and inputting an operation result generated by the up-converter to a down-converter, to generate the first test signal corresponding to the first signal path and the second test signal corresponding to the second signal path.

4. The calibration method according to claim 3, wherein the step of generating the delay signal and the compensated output signal further comprises:
inputting the sampling results of the first test signal and the second test signal generated by the analog-to-digital converter to a phase derotator, to generate a first derotated signal corresponding to the first signal path and a second derotated signal corresponding to the second signal path; and
respectively feeding the first derotated signal and the second derotated signal back to the delay chain and the finite impulse response filter, to generate the delay signal and the compensated output signal.

5. The calibration method according to claim 4, further comprising:
executing a subtraction operation for the first derotated signal and the second derotated signal to obtain a second calibration coefficient related to a phase-locked loop configured between the first signal path and the second signal path, and adjusting the first derotated signal and the second derotated signal generated by the phase derotator according to the second calibration coefficient.

6. A calibration circuit, used to calibrate mismatches between a first signal path and a second signal path of a transmitter, wherein a delay chain is configured in the first signal path to delay a signal transmitted through the first signal path, and a finite impulse response filter is configured in the second signal path to compensate the mismatches between the first signal path and the second signal path, the calibration circuit comprising:
a test signal generating unit, inputting a multiple-frequency signal to a digital-to-analog converter configured in both of the first signal path and the second signal path, and respectively inputting an output of the digital-to-analog converter in the first signal path and an output of the digital-to-analog converter in the second signal path to a low-pass filter configured in both of the first signal path and the second signal path, to generate a first test signal corresponding to the first signal path and a second test signal corresponding to the second signal path;
a sampling unit, respectively sampling the first test signal and the second test signal by at least one analog-to-digital converter, and respectively feeding sampling results generated by the analog-to-digital converter back to the delay chain and the finite impulse response filter, to generate a delay signal and a compensated output signal; and
a first calibration unit, executing a subtraction operation for the delay signal and the compensated output signal to obtain a first calibration coefficient related to the finite impulse response filter in the second signal path, and calibrating a plurality of tap coefficients of the finite impulse response filter by the first calibration coefficient, such that the calibrated finite impulse response filter in the second signal path compensates the mismatches between the first signal path and the second signal path.

7. The calibration circuit according to claim 6, wherein one of the first signal path and the second signal path is an in-phase signal path and the other one is a quadrature signal path.

8. The calibration circuit according to claim 6, wherein the test signal generating unit further inputs an output of the low-pass filter in the first signal path and an output of the low-pass filter in the second signal path to an up-converter for operation, and inputs an operation result generated by the up-converter to a down-converter, to generate the first test signal corresponding to the first signal path and the second test signal corresponding to the second signal path.

9. The calibration circuit according to claim 8, wherein the sampling unit further inputs the sampling results of the first test signal and the second test signal generated by the analog-to-digital converter to a phase derotator, to generate a first derotated signal corresponding to the first signal path and a second derotated signal corresponding to the second signal path, and respectively feeds the first derotated signal and the second derotated signal back to the delay chain and the finite impulse response filter, to generate the delay signal and the compensated output signal.

10. The calibration circuit according to claim 9, further comprising:
a second calibration unit, executing a subtraction operation for the first derotated signal and the second derotated signal to obtain a second calibration coefficient related to a phase-locked loop configured between the first signal path and the second signal path, and adjusting the first derotated signal and the second derotated signal generated by the phase derotator according to the second calibration coefficient.

* * * * *